United States Patent [19]
Carlson

[11] Patent Number: 5,571,856
[45] Date of Patent: Nov. 5, 1996

[54] SELF-CURING CLAY COMPOSITION AND METHOD

[75] Inventor: Bruce N. Carlson, Sioux Falls, S. Dak.

[73] Assignee: Dakota Chemaclay Corporation, Fort Dodge, Iowa

[21] Appl. No.: 585,655

[22] Filed: Jan. 16, 1996

Related U.S. Application Data

[63] Continuation of Ser. No. 257,744, Jun. 9, 1994, abandoned.
[51] Int. Cl.$^6$ ............................. C08J 5/10; C08K 3/34; C08L 25/10
[52] U.S. Cl. ........................ 524/446; 524/447; 524/445; 525/215; 525/196
[58] Field of Search ................................. 525/215, 196; 524/446, 447, 445, 449

[56] References Cited

U.S. PATENT DOCUMENTS

| | | | |
|---|---|---|---|
| 4,271,228 | 6/1981 | Foster et al. | 428/281 |
| 5,034,448 | 7/1991 | Koblinski et al. | 524/447 |

OTHER PUBLICATIONS

Whittaker, Clark & Daniels, Inc., "Material Safety Data Sheet—Calcium Stearate", Oct. 1989.
R. T. Vanderbilt Company, Inc., "Specification—Butyl Namate", Apr. 30, 1990.
Whittaker, Clark & Daniels, Inc., "Product Data Sheet for 1345 Calcium Stearate", Jul. 1991.
R. T. Vanderbilt Company, Inc., "Technical Data—Darvan® 811", Mar. 1992.
DuPont, "Neoprene Latex 400—Product Information", Jun. 1992.
R. T. Vanderbilt Company, Inc., "Specification—Zinc Oxide Dispersion", Aug. 21, 1992.
R. T. Vanderbilt Company, Inc., "Specification—Agerite Superlite Emulsion", Sep. 24, 1992.
R. T. Vanderbilt Company, Inc., "Specification—Butyl Zimate", Feb. 19, 1993.
Reichhold Chemicals, Inc., "Product Bulletin—Tylac® 97902–00", Mar. 1993.
R. T. Vanderbilt Company, Inc., "Material Safety Data Sheet—Butyl Zimate", Feb. 23, 1994.
R. T. Vanderbilt Company, Inc., "Material Safety Data Sheet—Butyl Namate", Feb. 23, 1994
R. T. Vanderbilt Company, Inc., "Material Safety Data Sheet—Zinc Oxide Dispersion (60%)", Feb. 23, 1994.
R. T. Vanderbilt Company, Inc., "Material Safety Data Sheet—Agerite Superlite Emulsion", Feb. 23, 1994.
R. T. Vanderbilt Company, Inc., "Technical Data—Butyl Namate".
Henkel Corporation, "Product Bulletin—Nopco® NDW".

*Primary Examiner*—Paul R. Michl
*Assistant Examiner*—U. K. Rajguru
*Attorney, Agent, or Firm*—Wood, Phillips, VanSanten, Clark & Mortimer

[57] ABSTRACT

An aqueous, self-curing clay composition is cured to a ceramic-like state without firing. The clay composition includes a first elastomer capable of curing the composition to a ceramic-like state without firing and a second elastomer that cures upon the removal of water.

24 Claims, No Drawings

SELF-CURING CLAY COMPOSITION AND METHOD

This application is a continuation of application Ser. No. 08/257,744, filed Jun. 9, 1994 now abandoned.

TECHNICAL FIELD

The present invention relates to a clay composition and method and, more particularly, to a self-curing clay slip composition and method wherein the cure is accomplished in the absence of added heat.

BACKGROUND OF THE INVENTION

The universal properties of ceramics include mechanical strength in spite of brittleness, chemical durability, hardness and ability to be decorated. Ceramic products include porcelain (for figurines, vases, etc.), whiteware (dinnerware, sanitary ware, floor tile, etc.), structural products (brick, tile, terra cotta, etc.) and the like. These products are often referred to as pieces.

Many of the above pieces are produced using a mold and a ceramic slip. The ceramic slip is poured into a plaster of paris mold that draws enough water from the adjacent slip to build up a solid body layer on the mold. After the desired thickness of the solid body layer is obtained, the excess slip is poured off. The mold is parted and the solid body layer is removed and fired at an elevated temperature in an oven to cure the ceramic. If the body layer is not fired the ceramic will not cure. The firing process can be complex, requiring temperature changes throughout the firing process. If not performed properly, the piece can break during firing.

Problems exist with this production process. The mold walls must be thick because the slip has a high viscosity and a high specific gravity. A thick-walled mold is heavy making it difficult to use. The time required to build the solid body layer is relatively long, which increases the turn-around time before the mold can be used to produce the next copy of the piece. Firing is a costly process because of the expense of the oven, the time required to perform the firing and the breakage of pieces.

The ceramics industry is interested in entering new markets, such as making ceramics available to hobbyists. The use of a ceramic slip imposes the same problems to the hobbyist as it does to the ceramics industry. Hobbyists also do not want to spend time waiting for the solid body layer to form or for the firing to proceed. Furthermore, hobbyists often do not have access to the oven or the skill to properly fire the solid body layer. The added cost of firing is a detriment to the hobbyist's use of ceramics.

The ceramics industry has attempted to overcome the problems hobbyists face by premanufacturing the pieces for the hobbyist to paint. However, the satisfaction achieved by the hobbyist is not as great as when the hobbyist manufactures the piece. The industry is also faced with the above-described problems of mold wall thickness, build-up time and firing. To avoid the firing problems, the industry markets "greenware," which is an unpainted and unfired piece. Greenware merely shifts the firing problems from the industry to the hobbyist. An additional problem is that the pre-manufactured pieces can chip or break during shipping, rendering them useless.

An alternative has been to make the pieces out of plaster, as opposed to ceramics. The plaster pieces must be solid for strength, which increases their weight and hence the shipping costs. A rubber mold is used which provides less detail than the plaster mold. The plaster pieces are also subject to chipping and breakage.

The present invention is directed to solving one or more of the problems discussed above in a novel manner.

SUMMARY OF THE INVENTION

In accordance with the invention, there is provided a clay composition that is self curing.

Broadly, there is disclosed herein a self-curing clay composition that includes an elastomer system. The elastomer system has a first elastomer and a second elastomer, with the second elastomer partially curing the composition upon removal of water from the clay composition.

It is a feature of the invention that the first elastomer cures the clay composition to a solid, ceramic-like state in the absence of added heat.

It is another feature of the invention that, once the clay composition is cured, one of the elastomers can be heated to permit controlled deformation of the cured slip composition.

There is disclosed in accordance with another aspect of the invention a self-curing clay slip composition that includes clay, water, a first elastomer capable of curing the slip composition to a solid, ceramic-like state, and a second elastomer that cures upon the removal of water. The clay slip composition can also include at least one of a cross-linking agent and an accelerant for the second elastomer.

It is a feature of the invention that the clay is present in an amount in the range of 40 to about 50 weight percent (wt %), the water is present in an amount in the range of about 10 to about 20 wt %, the first elastomer is present in an amount in the range of about 20 to about 40 wt %, the second elastomer is present in an amount in the range of 5 to about 15 wt %, the cross-linking agent is present in an amount in the range of about 0.5 to about 3 wt % and the accelerant is present in an amount in the range of about 0.5 to about 3 wt %. These weight percents are based on the total weight of the clay slip composition.

It is another feature of the invention that the clay include feldspar.

It is still another feature of the invention that the viscosity of the slip composition be in the range of about 40 to about 50 seconds.

It is still another feature of the invention that the specific gravity of the slip composition be in the range of about 1.5 to about 1.6.

There is disclosed in accordance with another aspect of the invention a method of making a self-curing clay composition that cures without heating to an elevated temperature. The method includes the steps of producing a first precomposition by mixing clay, water and a first elastomer capable of curing the composition to a solid, ceramic-like state. A second precomposition is produced by mixing an elastomer capable of curing upon the removal of water with at least one of a cross-linking agent and an accelerator for the second elastomer. The first and second precompositions are then added together.

It is a further feature of the invention that the method include the step of mixing a colorant with the first precomposition.

There is disclosed in accordance with yet another aspect of the invention a method of making a clay-containing piece that includes the steps of introducing a self-curing clay composition into a mold and molding the clay composition with the mold to a desired shape.

It is a further feature of the invention that the clay composition is a clay slip composition and the mold have an interior surface and that the method includes the step of removing water from the slip composition adjacent to the interior surface to produce a reduced water solid body layer on the interior surface.

It is another feature of the invention that the method includes the steps of removing the slip composition from the mold after the solid body layer is produced, removing the body layer from the mold in a time period of less than about two hours after the slip is removed and producing a ceramic-like piece, without firing, in less than about ten hours after the slip composition is removed.

A still further feature of the invention is a clay piece made in accordance with the method.

Upon removal of water, the second elastomer cures the composition adjacent to the mold to produce the solid body layer. After the slip is removed, the first elastomer cures the composition to produce a strong piece having the look and feel of ceramic. The slip composition has a low viscosity and specific gravity, as compared to conventional ceramic slip compositions, which enables the use of molds having thinner walls which reduces the weight of the mold making them easier to handle. The clay slip composition also builds up the solid body layer quicker than the conventional ceramic slip compositions and does not require firing. Thus, the turn-around time to mold a piece is decreased which increases the utilization of the mold and decreases the cost per piece.

The ceramics industry can use the clay composition to produce many of products now produced using conventional ceramic materials.

The clay slip composition can be used by the hobbyist to enable the hobbyist to experience the satisfaction of actually making a piece. A plaster mold can be used which results in the piece having greater detail. The problems of shipping pre-manufactured pieces are avoided because the hobbyist makes the piece.

Reducing the water content of the clay slip composition increases its viscosity to produce a self-curing, high viscosity clay composition that can be troweled onto a surface or thrown on a potter's wheel.

Further features and advantages of the invention will be readily apparent from the specification.

DETAILED DESCRIPTION OF THE PREFERRED EMBODIMENTS

An aqueous self-curing clay composition is capable of binding clay to produce a ceramic-like piece. The clay composition includes an elastomer system having a first elastomer and a second elastomer. The second elastomer partially cures the clay composition to a self-supporting state upon removal of water from the clay composition that results in a solid body layer being formed on a mold surface or a solid body being produced if the clay is molded by hand or an instrument other than a mold. The composition is cured to a solid, ceramic-like state in the absence of added heat. The clay composition can also include clay and at least one of a cross-linking agent and an accelerant for the second elastomer. Optionally, the clay composition can further include a stabilizer and an antioxidant. Preferably, the clay composition is a clay slip composition.

The term "self curing," as used in its various grammatical forms, indicates that the clay composition cures into its ceramic-like state without requiring firing, i.e., without requiring heat supplied by an external source.

The term "ceramic like," as used in its various grammatical forms, indicates that the cured piece made from the clay composition has the look and feel of a conventional ceramic piece, although it is not as brittle as the conventional ceramic piece.

The term "self-supporting," as used in its various grammatical forms, identifies a solid body layer or a solid body that maintains its shape.

The terms "solid body layer" and "solid body," as used in their various grammatical forms, identifies partially-cured clay composition having a reduced water content, as compared to the clay composition with the solid body layer being adjacent to an interior surface of a mold cavity from a slip composition and the solid body being produced by a process other than on that uses the slip composition.

The first elastomer contributes to the cure of the clay composition to a solid, ceramic-like state without firing. The final look and feel of the cured clay slip composition is dependent not only upon the first elastomer but also upon the clay. The first elastomer preferably provides rigidity and structural strength to a piece made from the clay composition. If an excess amount of the first elastomer is utilized, the cured piece will have a more plastic-like consistency which may be desirable in some instances but is undesirable when trying to achieve the look and feel of ceramic. If an insufficient amount of the first elastomer is utilized, the clay will not be bound and the piece will fall apart.

The first elastomer can be a combination of elastomers to obtain different physical characteristics under different conditions. For example, the first elastomer can be a combination of a rigid elastomer and a heat malleable elastomer to produce a heat malleable clay composition. The rigid elastomer provides the structural strength. The heat malleable elastomer permits controlled deformation of the cured composition when it is heated and then subjected to external forces. The deforming heat and external force can be supplied by a person's hand.

Representative first elastomers include styrene butadiene rubbers, and the like.

A commercially available preferred carboxylated styrene butadiene rubber is Tylac™ 97902-00, which is commercially available from Reichold Chemical, Research Triangle Park, N.C. This Tylac™ product is an aqueous styrene butadiene rubber suspension having: about 55 to about 60 weight percent (wt %) rubber; about 56 to about 59 wt % nonvolatiles; a pH of about 7.5 to about 8; a Brookfield viscosity taken with a No. 2 spindle at 20 rpm of about 400 to about 700 cps; a surface tension of about 35 to about 45 dynes/cm; a specific gravity of about 0.96; a glass transition temperature of about 17° C.; and particles whose size is about 1900 to about 2100 Å.

To produce the heat malleable slip composition, an amount of a softer, heat malleable first elastomer (e.g., Tylac™ 68014-00, commercially available from Reichold Chemical, which is a styrene butadiene rubber) is also utilized.

The second elastomer cures upon the removal of water and partially cures the composition to achieve a self-supporting state. Although the second elastomer permits the removal from a mold and achieving the self-supporting state in a relatively short time period, the use of the second elastomer by itself without the first elastomer to provide the desired rigidity and structural strength would result in the piece being rubbery and more plastic-like. This result is undesirable when trying to achieve a ceramic-like quality.

Representative second elastomers include copolymer of chloroprene and 2,3-dichloro-1,3-butadiene (i.e., a neoprene latex) and the like.

A presently preferred, commercially available neoprene latex is Neoprene 400 from DuPont, Wilmington, Del., which has: potassium salts of disproportionated resin acids as the emulsifying agent; of about 50 wt % solids, a pH at 25° C. (77° F.) of about 12.5; a specific gravity at 25° C. (77° F.) of about 1.42 (for the polymer) and 1.15 (for the latex); an average particle size of about 0.12 microns; a surface tension of about 37.1 dynes/centimeter; and a Brookfield viscosity (model LVF, spindle no. 1) of 9 mPas at 6 rpm and mPas at 30 rpm at a temperature of 25° C. (77° F.). An alternative neoprene latex is –25° C. (77° F.). An alternative Neoprene latex is Neoprene 842A, also from DuPont. DuPont Neoprene 571 has also proven itself for some of our functions. Its advantage is an advanced cross link which renders it usable for minerals and clays with a sulfur content.

The clay can be a natural occurring material, e.g., a clay or a mineral, commonly used in ceramics, including the synthetic raw materials. The use of the term "clay" is intended to encompass these synthetic raw materials, unless specifically excluded, in addition to the natural materials. Preferably, the clay is not an organic clay. If gypsum is used, care must be taken to select a second elastomer that does not react with the gypsum to destabilize the composition. It is presently theorized that a suitable second elastomer for use with gypsum is Neoprene 842A.

The selection of the clay will determine whether the cured clay slip composition will be porcelain-like, terra cotta-like, stoneware-like, etc. Thus, to produce a porcelain-like piece, kaolin is utilized. To produce a terra cotta-like piece, kaolin and feldspar are used with iron oxide as a colorant. To produce a stoneware-like piece, the kaolin is utilized with gold or brown coloring.

Representative clays include kaolin, feldspar, HVC clay, gypsum and the like. A preferred clay is a 50/50 mixture, by weight, of kaolin and feldspar. Most preferably, the clay includes at least about 50 wt % feldspar.

An accelerator for the second elastomer can be used to control the rate at which the second elastomer cures and hence the rate at which the clay slip composition cures upon removal of water to produce the solid body layer or solid body layer.

A cross-linking agent can be utilized to facilitate the cure of the second elastomer. Representative cross-linking agents includes zinc oxide and the like.

Representative second elastomer accelerators include sodium di-n-butyl-dithiocarbamate, and the like. A preferred, commercially available sodium di-n-butyl-dithiocarbamate is butyl namate from R.T. Vanderbilt Co., Inc., Norwalk, Conn. Minerals can be utilized with the clay.

A first elastomer accelerator can also be utilized to control the rate at which the final cure of the clay composition to a ceramic-like state occurs. Representative first elastomer accelerators include zinc dibutyl dithiocarbamate, calcium stearate, and the like. A preferred first elastomer accelerator is butyl zimate from R.T. Vanderbilt Co., Inc. Norwalk, Conn., which is a zinc dibutyl dithiocarbamate. An alternative preferred first elastomer accelerator is calcium stearate, commercially available from Whittaker, Clark and Daniels, Inc., South Plainfield, N.J.

Handling of the cured clay composition by a person can result in the person's body oils reacting with the first or second elastomers and causing yellowing. This yellowing reaction can be avoided by the use of the butyl zimate.

An antioxidant can be utilized to inhibit deterioration of the cured elastomers. A representative antioxidant is Agerite Superlite emulsion, commercially available from R.T. Vanderbilt Co., Inc., Norwalk, Conn.

The clay slip composition can be colored using a conventional colorant such as titanium dioxide, zinc oxide, and the like. Preferably, the colorant is admixed with the first elastomer prior to the addition of the second elastomer.

To inhibit the clay from settling out, the composition can include a dispersing agent such as Darvan 811, a sodium polyelectrolyte commercially available from R.T. Vanderbilt Co., Inc.

Flame and water resistance can be improved by using alumina hydrate.

Preferably, the weight ratio, on a solids basis, of clay to first elastomer is in the range of about 2:1 to about 10:1, with the exact weight ratio being dependent upon the desired look and feel of the cured composition and the first elastomer and clay utilized.

If a heat malleable first elastomer is utilized with the rigid first elastomer, the weight ratio of rigid to heat malleable first elastomers is preferably in the range of about 1:2 to about 2:1.

The weight ratio of the first elastomer to the second elastomer is preferably in the range of about 1.5:1 to about 8:1.

The weight ratio, on a solids basis, of the clay to the first and second elastomers is preferably in the range of about 1.5:1 to about 4:1.

The preferred amounts of the components in the clay slip composition will now be discussed. The weight percents are based on the total weight of the clay slip composition. The clay is present in an amount in the range of 40 to about 50 wt %. The water, added as a separate component, is present in an amount in the range of about 10 to about 20 wt %. The first elastomer is present in an amount in the range of about 20 to about wt %. The second elastomer is present in an amount in the range of about 5 to about 15 wt %. The second elastomer accelerant is present in an amount in the range of about 0.5 to about 3 wt %. The cross-linking agent for the second elastomer is present in an amount in the range of about 0.5 to about 3 wt %. The first elastomer accelerator is present in an amount in the range of about 0.5 to about 3 wt %.

The alumina hydrate is used in an amount in the range of about 5 to about 15 wt % and replaces a like amount of the clay.

The viscosity of the clay slip composition is in the range of about 40 to about 50 seconds. The viscosity is tested using a Lehman manufacturers' viscosometer VS 500 which is a standard for the ceramic industry.

The specific gravity of the clay slip composition is in the range of about 1.5 to about 1.6.

The self-curing clay composition is produced by making a :first precomposition, a second precomposition and adding the first and second precompositions together. It is preferred to mix the first elastomer and its accelerator separately from the second elastomer and its accelerator to achieve substantially uniform distribution of the respective accelerators.

In a most preferred method of making the clay slip composition, when the first elastomer in an aqueous suspension, the clay and water are mixed to produce a slurry to which the first elastomer is admixed. The clay absorbs water. It is preferred to saturate the clay with water prior to introducing the first elastomer so that the first elastomer is not absorbed into the clay with the water but, rather, is available to participate in curing.

In a method of making a clay-containing piece using a mold, the self-curing clay composition is introduced into the mold and is then molded into the desired shape. The mold has a mold cavity defined by an interior surface. Preferably, the clay composition is a slip composition and the mold is made of a water sorbent material, such as plaster of parris, which removes water from the slip composition adjacent to the interior surface to produce the reduced water solid body layer on the interior surface. The body layer continues to build up over time. Preferably, the solid body layer attains a self-supporting thickness in a time period of less than about one hour. The slip composition that is not part of the body layer is poured out of the mold and the body layer is removed from the cavity, preferably in a time period of less than about two hours after the slip is removed. This time period can be reduced by exposing the body layer to external heat. A ceramic-like piece is attained within a time period of less than about ten hours after the slip composition is removed without requiring firing. Curing can be accelerated by exposing the body layer to an elevated temperature that drives off water remaining in the body layer. Within about ten hours of the slip composition being removed from the mold, the piece is workable in that it can be sanded, drilled and painted. At this time, the piece is also substantially break resistant, even though it continues to harden and cure over the next couple of days.

The water content of the clay slip composition can be reduced to increase its viscosity and produce a self-curing clay composition having a higher-viscosity. Preferably, the water content is reduced by removing water from the clay slip composition as opposed to making the clay composition directly from the individual components. The water that is removed can include water that is in the clay slip composition from any source. The amount of water removed depends upon the use of the clay composition. For example, removal of about 20% of the water increases the viscosity to enable the clay composition to be troweled onto a surface. Removal of up to about 10 wt % of the water can produce a clay composition that can be thrown on a potter's wheel and molded.

The following examples are given by way of illustration and not limitation.

EXAMPLE 1

Clay Slip Composition

A clay slip composition of the present invention was prepared as follows with the wt % being based on the total weight of the clay slip composition. To produce a first precomposition, clay, i.e., a 50/50 mixture, by weight, of kaolin and feldspar (45 wt %), and water (15 wt %) were introduced into a suitable vessel with mixing. After the water had been sorbed by the clay, Tylac® 97902 (25 wt %) and color (1 wt %) were introduced into the vessel with continued mixing.

To produce a second precomposition, Neoprene 400 (10 wt %), butyl namate (1 wt %), zinc oxide dispersion (1 wt %), butyl zimate (1 wt %), Darvan 811 (1 wt %) and Nopco® NDW, a defoamer, commercially available from Henkel Corp., Ambler, Pa., (a few drops) were introduced and mixed in a separate vessel. After mixing to obtain two substantially homogeneous precompositions, the two precompositions were admixed to produce the clay slip composition.

EXAMPLE 2

Heat Malleable Clay Slip Composition for Producing a Heat Malleable Clay Piece

A clay slip composition for producing a heat malleable clay piece was produced by introducing the clay of EXAMPLE 1 (45 wt % based upon the total weight of the clay slip composition) and water (15 wt %) into a suitable vessel with mixing. After the water was sorbed, Tylac® 97902 (12.5 wt %), Tylac® 68014 (12.5 wt %) and color (1 wt %) were introduced into the vessel with mixing to produce a first precomposition.

In a separate vessel, Neoprene 400 (10 wt %), butyl namate (1 wt %), zinc oxide dispersion (1 wt %), butyl zimate (1 wt %), Darvan 8 11 (1 wt %) and Nopco® NDW (a few drops) were introduced and mixed in a separate vessel to produce a second precomposition. After mixing to obtain two substantially homogeneous precompositions, the two precompositions were admixed to produce the heat malleable clay slip composition.

COMPARATIVE EXAMPLE 1

Clay Mixture

A comparative clay mixture was produced in a suitable vessel by introducing Neoprene 750 from DuPont (35 wt %), Tylac® 68014 (40 wt %), the clay of EXAMPLE 1 (20 wt %) and an admixture of butyl namate and zinc oxide (5 wt %) into the vessel and mixing. The resulting product when cured was too soft and light weight.

The clay slip composition has a relatively low viscosity and specific gravity which permits the use of a mold that is thinner than molds used with conventional ceramic slip compositions. The clay slip composition forms a solid body layer relatively quickly that can be removed from the mold in a relatively short period of time. The clay composition can be used to for a solid body. The solid body layer or solid body will cure into a ceramic-like piece within about 10 hours after removal without requiring firing.

It presently is theorized that the above-described advantages are achieved because of the use of the first and second elastomers. This combination of elastomers produces a system wherein the second elastomer cures upon the removal of water to produce the solid body layer, in the case of the slip composition, or the solid body, in the case of the clay composition. The solid body layer is flexible enough to be removed from the mold. The rigidity and ceramic-like qualities are achieved in part due to the first elastomer which is rigid when cured. The amount of clay also contributes to the cured clay composition having ceramic-like characteristics. The first elastomer can include the rigid elastomer and a heat malleable elastomer that provides flexibility and permits controlled deformation of the cured clay composition upon heating and the application of pressure.

It is also theorized that the method of making the clay composition contributes to its stability and to achieving the above-described advantages.

The clay composition can be used by the ceramics industry to produce pieces that were previously made using conventional ceramics. Hobbyists can use the clay composition to mold or throw pieces. The clay composition can be troweled onto a surface, permitted to cure and painted to produce three dimensional scenery for plays, shows, etc.

The cured heat malleable composition is useful in producing figurines whose limbs could be repositioned simply by heating them with a person's hand. An additional use would be for the extrusion molding of pieces.

The clay composition can be used to make casts used to immobilize limbs.

I claim:

1. An aqueous self-curing clay composition suitable for binding clay comprising an elastomer system including a first elastomer and a second elastomer, wherein the second elastomer partially cures the composition upon removal of water to a self-supporting state, the composition being curable to a solid, ceramic-like state in the absence of heat from an external source.

2. The clay composition of claim 1 wherein the first elastomer cures the composition to a solid, ceramic-like state.

3. The clay composition of claim 1 wherein the first elastomer is a styrene butadiene rubber and the second elastomer is a neoprene latex.

4. The clay composition of claim 1 wherein when the clay composition is cured, one of the elastomers can be heated to permit controlled deformation of the cured clay composition.

5. The clay composition of claim 1 further comprising clay including feldspar.

6. A self-curing clay slip composition consisting essentially of: clay; water; a first elastomer capable of curing the composition to a ceramic-like state in the absence of added heat; and a second elastomer that cures upon the removal of water to transform the clay slip composition to self-supporting state.

7. The clay slip composition of claim 6 wherein the clay includes feldspar.

8. The clay slip composition of claim 6 further comprising at least one of a cross-linking agent and an accelerant for the second elastomer.

9. The clay slip composition of claim 6 wherein first elastomer includes a rigid elastomer and a heat malleable elastomer.

10. The clay slip composition of claim 6 having a specific gravity in the range of about 1.5 to about 1.6.

11. The clay slip composition of claim 6 wherein the first elastomer is a styrene butadiene rubber and the second elastomer is a neoprene latex.

12. A method of making a self-curing clay slip composition that cures without heating to an elevated temperature, the method comprising the steps of:
   (1) producing a first precomposition by:
      mixing clay, water and a first elastomer capable of curing the composition to a ceramic-like state without firing;
   (2) producing a second precomposition by:
      mixing a second elastomer that cures upon the removal of water from the slip composition, and at least one of a cross-linking agent and an accelerator to produce the second precomposition; and
   (3) adding the first and second precompositions together.

13. The method of claim 12 further comprising the step of mixing a colorant with the first precomposition.

14. The method of claim 12 wherein the first elastomer is a styrene butadiene rubber and the second elastomer is a neoprene latex.

15. The method of claim 12 further comprising the step of (4) removing water to produce a clay composition.

16. The clay slip composition of claim 6 having a viscosity in the range of about 40 to about 50 seconds.

17. The clay composition of claim 1 wherein the weight ratio of the first elastomer to the second elastomer is in the range of about 1.5:1 to about 8:1.

18. The clay composition of claim 17 wherein the weight ratio, on a solids basis, of the clay to the first elastomer is in the range of about 2:1 to about 10:1.

19. The clay composition of claim 1 wherein the clay composition is a clay slip composition.

20. A clay piece produced from the clay composition of claim 1.

21. The clay composition of claim 6 wherein the weight ratio of the first elastomer to the second elastomer is in the range of about 1.5:1 to about 8:1.

22. The clay composition of claim 21 wherein the weight ratio, on a solids basis, of the clay to the first elastomer is in the range of about 2:1 to about 10:1.

23. A clay piece produced from the clay composition of claim 6.

24. The clay composition of claim 12 wherein the weight ratio of the first elastomer to the second elastomer is in the range of about 1.5:1 to about 8:1.

* * * * *